United States Patent [19]

Yung-Chaun

[11] Patent Number: 5,148,044
[45] Date of Patent: Sep. 15, 1992

[54] STRUCTURE OF MULTIPLEX CONNECTOR

[76] Inventor: Chen Yung-Chaun, No. 98, Chun Jih Road, Taoyuan City, Taipei, Taiwan

[21] Appl. No.: 485,507

[22] Filed: Feb. 27, 1990

[51] Int. Cl.$^5$ ............................................. H05B 39/04
[52] U.S. Cl. ................................... 307/140; 301/117; 301/139
[58] Field of Search .................. 307/139, 140, 117

[56] References Cited

U.S. PATENT DOCUMENTS

| | | | |
|---|---|---|---|
| 3,680,047 | 7/1972 | Perlman | 317/117 |
| 3,820,097 | 6/1974 | Larson | 307/117 |
| 4,305,021 | 12/1981 | Schreiden | 307/117 |
| 4,450,351 | 5/1984 | Fraden | 307/117 |
| 4,650,982 | 3/1987 | Maile | 250/214 SW |
| 4,663,521 | 5/1987 | Maile | |
| 4,843,283 | 6/1989 | Chen | 415/153 |
| 4,890,093 | 12/1989 | Allison et al. | 307/117 |

Primary Examiner—Steven L. Stephan
Assistant Examiner—Thomas M. Dougherty

[57] ABSTRACT

A multiplex connector, which includes a first circuit for providing a reference voltage to a photoelectric comparator by means of a photoelectric operation so as to further control a charge/recharge-timer circuit; a second circuit comprising a pyroelectric infrared detector which is triggered by means of a change in ambient temperature for providing a signal through an amplifier circuit and a window-limited comparator to the charge/recharge-timer circuit for closing or opening a driving circuit to further control the load. Through full-wave rectification and current amplification, an electronic switching circuit is also provided to control the power supply to the load which is connected thereto in series.

4 Claims, 5 Drawing Sheets

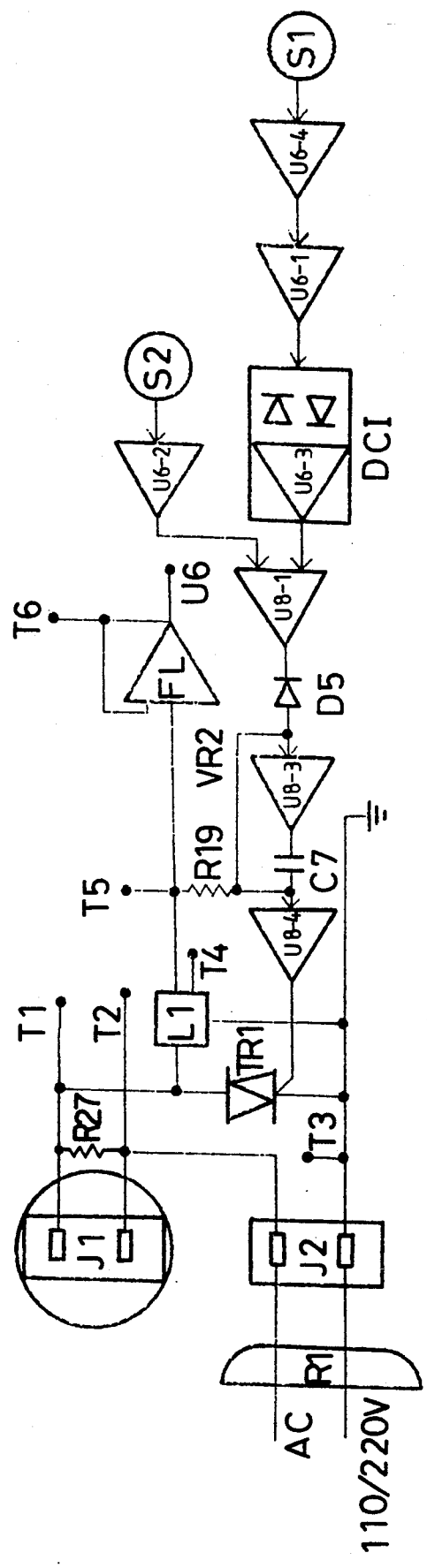
F I G. 1

STRUCTURE OF MULTIPLEX CONNECTOR

BACKGROUND OF THE INVENTION

The present invention is related to a type of multiplex connector to automatically control the operation of electric home appliances, monitoring systems, alarm systems, and the like through twist switching according to the proximity effect of a moving object.

Regular electric home appliances are generally controlled by a mechanical press button or sliding switch. When in the dark, it is difficult and dangerous to find a control button or switch. There is a kind of remote control for controlling TV, automatic door, electric appliances or alarm device, which includes a transmitter and a receiver to transmit and receive radio frequency or infrared waves, in which an electric power source is connected in series to a load, and the transmitted signal is processed through an amplifier, comparator, timer, driver circuit, and relay or TRIAC to further turn on the connected load. The disadvantage of this type of remote controller is that the transmitter must be constantly carried by the user for controlling the receiver. There is also a kind of automatic lamp controller which utilizes a photoelectric element CDS to trigger a TRIAC to control the power supply for the lamp. The disadvantage of this kind of automatic lamp controller is that it constantly consumes electric power during the dark even if illumination is not required. Regular automatic door and security control switches utilize a combination of infrared transmitter and receiver to control the power supply to a load according to a proximity effect. The disadvantage of this type of control switch is that it consumes a large amount of electric power for a single purpose application, and installation requires professional people to perform.

SUMMARY OF THE INVENTION

The present invention provides a multiplex connector, which includes a pyroelectric infrared detector incorporated with a photoelectric element (CDS). The change of ambient temperature caused by moving objects is detected by the pyroelectric infrared detector via a focusing lens, amplified by a band pass amplifier and compared by a comparator to trigger a TRIAC via a photo coupling element to further control a power socket and power plug to supply the load with a necessary working voltage. The change of the intensity of light triggers the photoelectric element to change potential and to simultaneously control an electronic switching circuit to turn on the circuit so as to further trigger the TRIAC to provide the load with necessary working voltage. The present invention is practical for automatically controlling a warning device, burglar alarm, monitoring device and lighting equipment, and can provide low voltage DC power for small electric home appliances.

BRIEF DESCRIPTION OF THE DRAWINGS

FIG. 1 is a block diagram of a first embodiment of the present invention;

DETAILED DESCRIPTION OF THE PREFERRED EMBODIMENTS

Figure 2:
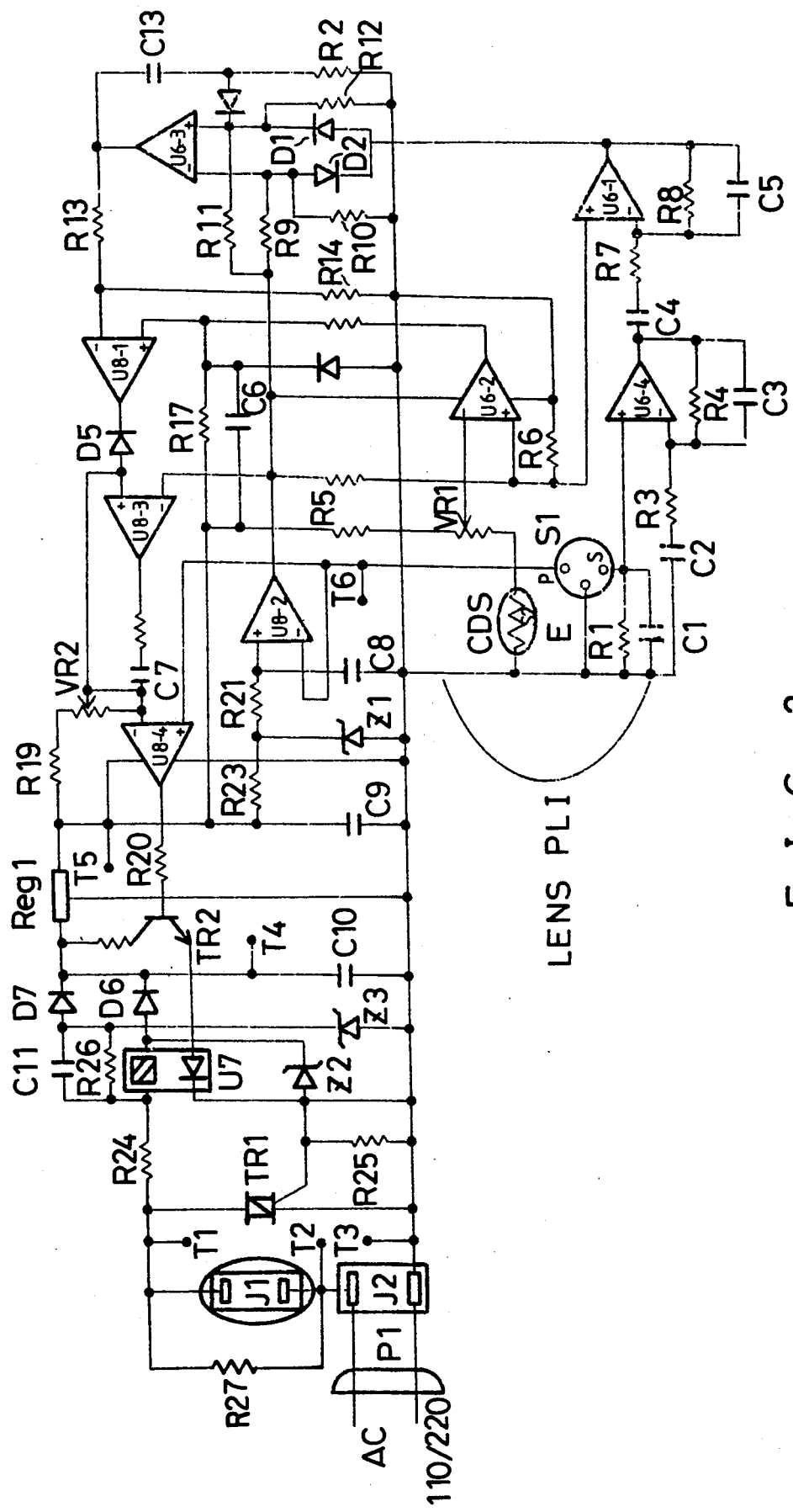
FIG. 2 is a circuit diagram for the first embodiment of the present invention.

A multiplex connector in accordance with the present invention includes two types of energy converting elements one is a detector which can convert any temperature change, due to the movement of an object within a reasonable area in the free space proximate the connector, into an electrical signal. The other is a photoresistance element which can change potential according to the intensity of light it detects. The circuit connected to the detector is arranged in a small plastic box and includes:

a pyroelectric infrared detector S1 provided with multiple focusing lenses PL1 which focus infrared heat source on the detector;

a band pass amplifier circuit made up of a first band pass amplifier U6-4 having an input terminal connected to an output terminal of the detector S1, and a second band pass amplifier F2 having an input terminal connected to an output terminal of the first band pass amplifier U6-4.

a window-limited first comparator circuit DC1 including a first comparator U6-3 having two input terminals connected to the output terminals of the band pass amplifiers U6-4 and U6-1 via two diodes;

a second comparator U8-1 having a first input terminal connected to the output terminal of the window-limited first comparator U6-3 and a second input terminal connected to the output terminal of the photoresistance S2 and a third comparator U6-2;

a random coupler U8-3 to control a timer circuit, having its input terminal connected to the output terminal of the second comparator U8-1 via a one-way conductive diode D5;

a fourth comparator U8-4 having its input terminal connected as shown in FIG. 2, to resistor R19, potentiometer VR2 and capacitor C7 of the timer circuit, and its output terminal connected to triac TR1, as shown in FIGS. 1 and 2, and transistor TR2 shown in FIG. 2 for transistors and further connection to an external electric appliance;

a power source circuit including a reference voltage power supply TRIAC TR1, for conditioning the AC power from a plug P1 and power socket J2 through current limitation, and voltage rectification and regulation so as to provide a variety of low voltage DC power levels for output to terminals T4, T5, T6 of the preferred connector, and to light control socket J1.

FIG. 2 illustrates a functional circuit diagram of the preferred multiplex connector, including an inductive logic switch. The wavelength of the weak infrared signal which is induced from a temperature change caused by a change in ambient conditions or the movement of objects is about 1-15 UM. Through the filtration and focusing of the focusing lens PL1, the collected infrared signal is projected on the pyroelectric infrared detector S1 to cause a change in internal electric charge. By means of the amplification process through an inner FET amplifier FET of the detector S1, the output from the detector S1 is sent through a pin S and coupled to the positive end of the amplifier U6-4 and to resistor R1 and capacitor C1 to form with resistors R3 and R4, and capacitors C2 and C3 a first band pass amplifier. The output terminal of the first band pass amplifier is connected to the negative end of an amplifier U6-1. Resistors R7, and R8 and capacitors C4, and C5 form a second band pass amplifier. Resistors R5, and R6 provide the positive end of the second band pass amplifier with a reference potential. The second band pass amplifier U6-1 is connected via diodes D1 and D2 to window limited comparator circuit U6-3, the output of which is connected to a negative input of second comparator U8-1. The output from a third comparator U6-2 provides the positive input to the second comparator U8-1 with a reference potential to determine what intensity of light and consequent level of the signal from detector S1 can control the system operation. Under normal conditions, when the ambient light around the lighting device on the light socket J1 is decreasing the internal impedance of the photoresistance S2 is increased to cause the voltage at the negative end of the third comparator U6-2 to become higher than the voltage at its positive end. Thus, the output from the third comparator U6-2 is at a low level, and the second comparator U8-1 is allowed to receive the signal provided by the detector S1 for controlling the ON/OFF status of the lighting device on the control socket J1. Therefore, the photoresistance can be triggered for automatic operation control according to the change of the intensity of ambient light.

With respect to the power source, the power plug P1 can be directly inserted in the power socket of the power system or connected to the switch of the original power system through parallel or series connections by means of terminals T1 and T3, so as to provide the load L1 with necessary working power through automatic control. The power socket J2 is connected with the power plug P1 in parallel for power transmission. One point of the plug P1 and the current limit resistor R27 are connected in parallel to power two terminals of the socket J1 for further connection in series with a current limiting resistor R24, capacitor C11 and discharging resistor R26 so as to provide the Zener diode Z3, capacitor C11 and discharging resistor R26 with a low voltage DC power. The other circuit is provided by the photo-coupling element U7 Diac and diodes Z2 and D6 to stabilize the voltage when a gate of said triac is turned on. Through the operation of the regulator Reg. 1 and the capacitor C9, power is provided to the above-described bandpass and comparator circuits and to element U7. Through the resistor R21, the diode Z1, the capacitor C8 and the resistor R23, a reference voltage is provided to the coupler U8-4. The output of coupler U8-4 provides the logic circuit series including U6 OP amps U6-1 to U6-4, and the terminals T4, T5, T6 with necessary power. The U6 circuits and output terminal T6 are connected via differential amplifier FL.

Figure 3:
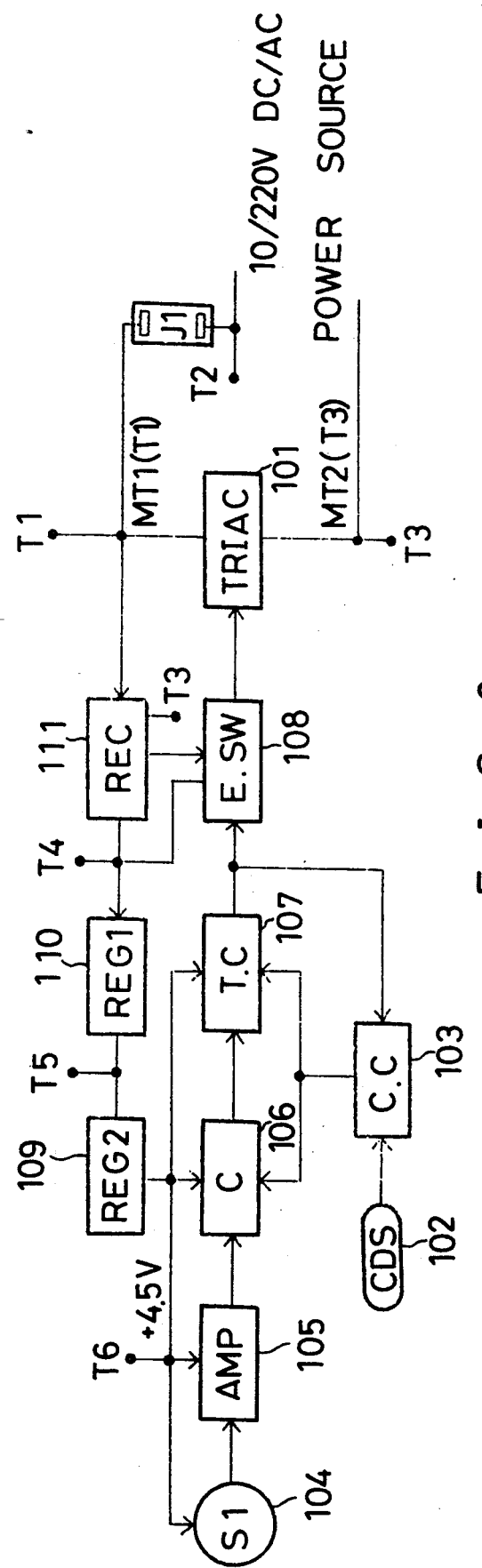
FIG. 3 is a block diagram of a second embodiment of the present invention.

FIG. 3 illustrates an alternate form of block diagram according to a present invention, in which the load (not shown) is connected in series with the electric poles (shown in FIG. 4 as poles MT1 and MT2) of TRIAC Q104 in TRIAC circuit (101) to determine a reference potential for the photoelectric comparator circuit (103) by means of regulating a variable resistor and photoelectric element CDS (102); to control a timer-comparator circuit (107) according to the range of circuit signal output; and to provide a comparative voltage to the input terminal of the timer comparator circuit (107) according to the output range from the photoelectric comparator circuit (103) and the window-limited comparator circuit (106), whose output range is determined according to the ambient temperature change caused by a moving human body, by utilizing the converted energy from the pyroelectric infrared detector (104) via the band pass amplifier circuit (105). When the output of the photoelectric comparator circuit (103) is at a certain level in the day, the output from the times comparator circuit (107) does not work during discharging irrespective of the ambient temperature, and the charge/recharge-timer comparator circuit (107) gives an instruction to turn on the electronic switching circuit (108) only when the intensity of light reaches a predetermined range; to trigger the TRIAC (101) to control the power for the load by means of utilizing the shunted current from the full-wave rectifier (111) and the connected current limit resistor where AC power is converted into DC pulses and sent to regulator circuits (110) (109) for regulation.

Figure 4:
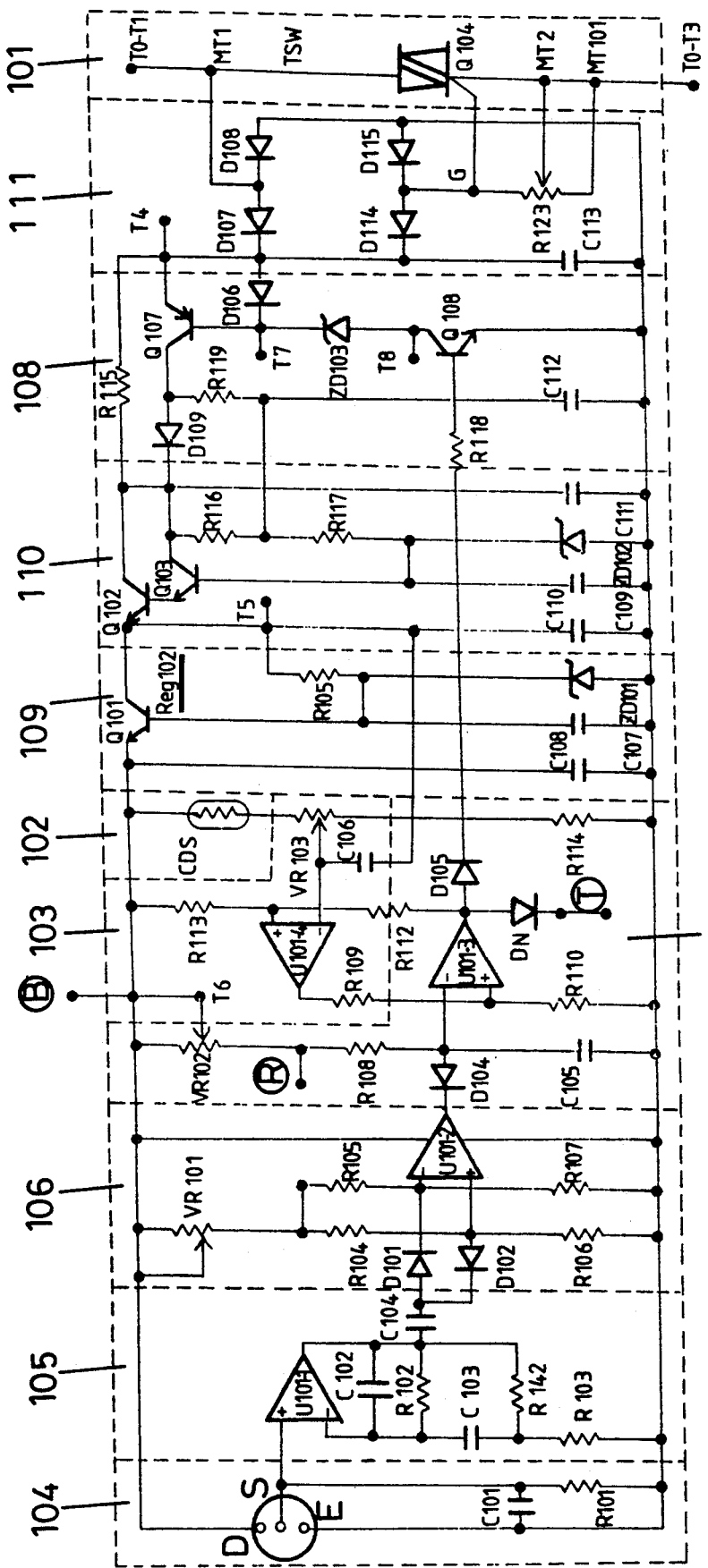
FIG. 4 is a circuit diagram for the second embodiment of the present invention.

Referring to FIG. 4, which is a circuit diagram for the aforesaid alternate form of the present invention, a signal is amplified by the internal FET of the pyroelectric infrared detector 104 and sent out through its S pole to the positive end of an amplifier U101-1, which is also connected to a by-pass capacitor C101 and a biasing resistor R101. The capacitors C102, and C103 and resistors R102, R103, and R142 between the output terminal of the amplifier U101-1 and its negative pole form a band pass filter amplifier circuit, the output of which is coupled by a capacitor C104 to the positive and negative poles of the diodes D101, and D102 of the window-limited comparator circuit (106). By means of the shunting through resistors R104, R105, and R107, the aforesaid resistors are connected with a variable resistor VR101 in series to regulate the range of operation of the comparator U101-2, so as to determine its sensitivity, stability and efficiency, and prevent erroneous operation. By means of regulating the charging and discharging time of the timer comparator circuit 107 including variable resistor VR102, resistor R108 and capacitor C105, the comparator 101-3 is driven to compare the window-limited comparator output voltage with a reference voltage input via resistors R109 and R110. Variable resistor VR103 regulates the voltage supplied to the first regulator (110) via capacitor C106. The photoelectric element CDS (102) is connected to an output terminal of the second regulator (109). The aforesaid capacitor C106 is for timing control with the variable resistor VR102, and capacitor C105 and for the delay of automatic turn-off of the lamp in the night. The output from the comparator U101-4 is to provide the comparator U101-3 with a reference voltage. The electronic switching transistor Q108 of electronic switching circuit 108 is turned on when diode D105 receives an output from the comparator U101-3. As soon as Q108 is turned on, voltage is stabilized through diode D106 and zener diode ZD103, and voltage shunt through diodes D107, D108, D114, and D115, and resistor R123 turns on Q104 to cause the π type filter circuit of capacitors C112, and C113 and resistor R120 to short circuit. By means of closing and opening TRIAC Q104, the waveform change is reduced. The AC power from terminals MT102 and MT101 is bridge-rectified and turned into a DC power through D107, D108, D114, D115, and R123 to the gate of the TRIAC Q104. Therefore, when Q108 is turned on, Q104 is triggered simultaneously. Resistor R123 serves to adjust the power of transistor Q104 so as to accommodate different loads. Capacitors C113 and C111, and resistor R120, form a pi filter circuit which provides a voltage to the regulator (110) via transistors Q102 and Q103. Regulator 110 includes, is a voltage dropping resistor R105, zener diode ZD101 for stabilizing the voltage, and capacitor C108 for eliminating noise and providing transistor Q101 with a stabilized voltage.

Figure 5:
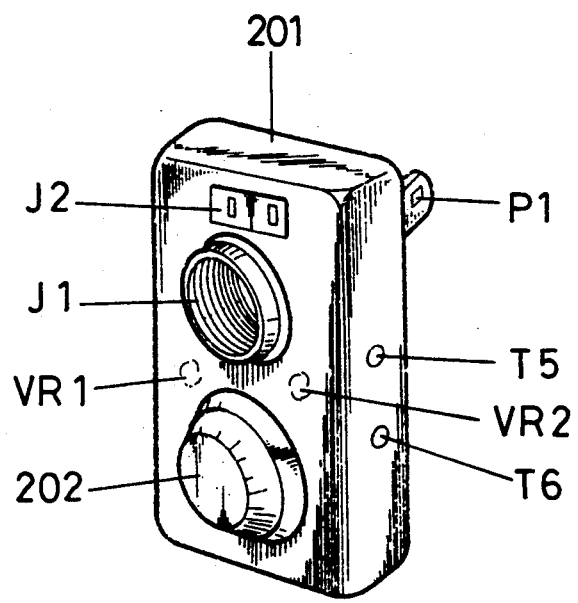
FIG. 5 is a perspective view of a multiplex connector embodying the present invention.

Referring to FIG. 5 a multiplex connector of the present invention includes a housing having mounted thereon a focusing lens L01 in semi-spherical shape and comprised of a plurality of small, arch-shaped lenses permitting outside signal to be projected on the detector S1 and photoresistor therein. Also shown are power socket J2, light socket J1, plug P1, terminals T5 and T6, and potentiometers VR1 and VR2.

What is claimed is:

1. A multiplex connector, comprising:

means including a pyroelectric infrared detector for detecting changes in ambient temperature;

a bandpass amplifier having an input terminal connected to an output pole of said pyroelectric infrared detector;

a window-limited comparator circuit including a first comparator having an input terminal connected to an output terminal of said bandpass amplifier;

a timer circuit including a second comparator having an input terminal connected to an output terminal of said window-limited comparator circuit;

a third comparator having an input terminal connected to an output terminal of a photoelectric element, an output terminal of said third comparator being connected to a second input terminal of said second comparator;

a triac and a rectifier circuit connected in series with a load;

means including an electronic switching circuit connected between an output terminal of said second comparator and said triac for triggering said triac when said second comparator is switched on, said rectifier circuit including a full-wave and a current limiting resistor connected between said triac and said load respectively to turn said load on and off when said second comparator is switched on and off in response to signals detected by said infrared detector;

a first voltage regulator having an input terminal connected to an output terminal of said rectifier circuit and said electronic switching circuit, and a second regulator having an input terminal connected to an output terminal of said first regulator and an output connected to a second pole of said pyroelectric infrared detector to form a loop, wherein said triac includes a gate connected to a shunt point of said rectifier circuit, said triac comprising two electric poles which are triggered to shunt a voltage produced by the closing and opening of a transistor of said electric switching circuit, said transistor therefore being controlled by said loop, so as to provide said load with a working voltage; and means including said photoelectric element and a variable resistor, said variable resistor being connected in series between said photoelectric element and an input of said third comparator for providing a reference potential which determines an intensity of light required to switch on said third comparator.

2. A connector as claimed in claim 1, wherein said rectifier circuit includes means for providing a DC pulse to eliminate surges by means of said electronic switching circuit.

3. A connector as claimed in claim 1, wherein said connector is connected in series with said load to provide said load with working energy according to ambient temperature changes and pre-determined intensities of light, and further comprising means for providing a delay instruction to trigger said triac after a pre-determined period of time.

4. A connector as claimed in claim 1, further comprising a focusing lens having a semi-circular configuration including a plurality of convex lenses for focusing signals on said pyroelectric infrared detector.

* * * * *